US008341517B2

(12) United States Patent
Terayoko

(10) Patent No.: US 8,341,517 B2
(45) Date of Patent: Dec. 25, 2012

(54) CONTENT DISPLAY METHOD, CONTENT DISPLAY PROGRAM AND CONTENT DISPLAY DEVICE

(75) Inventor: Hajime Terayoko, Saitama (JP)

(73) Assignee: Fujifilm Corporation, Tokyo (JP)

( * ) Notice: Subject to any disclaimer, the term of this patent is extended or adjusted under 35 U.S.C. 154(b) by 1288 days.

(21) Appl. No.: 12/050,261

(22) Filed: Mar. 18, 2008

(65) Prior Publication Data

US 2008/0316229 A1 Dec. 25, 2008

(30) Foreign Application Priority Data

Mar. 19, 2007 (JP) ................................ 2007-070269

(51) Int. Cl.
*G06F 17/00* (2006.01)

(52) U.S. Cl. ....................................... 715/243; 345/619

(58) Field of Classification Search ........................ None
See application file for complete search history.

(56) References Cited

U.S. PATENT DOCUMENTS 5,943,243 A * 8/1999 Sherlekar et al. ............. 716/122
5,956,738 A * 9/1999 Shirakawa .................... 715/273
6,396,506 B1 * 5/2002 Hoshino et al. ............... 345/650
6,486,898 B1 * 11/2002 Martino et al. ............... 715/853
2002/0118214 A1 * 8/2002 Card et al. .................... 345/619
2003/0080960 A1 * 5/2003 Chang ........................... 345/423
2003/0085931 A1 * 5/2003 Card et al. .................... 345/853
2003/0122827 A1 * 7/2003 Van Koningsveld .......... 345/440
2005/0119983 A1 * 6/2005 Bonabeau et al. .............. 706/46
2005/0185000 A1 * 8/2005 Nonaka ......................... 345/590
2006/0053398 A1 * 3/2006 Cox et al. ........................ 716/11
2008/0091778 A1 * 4/2008 Ivashin et al. ................. 709/204
2008/0209387 A1 * 8/2008 Biehl et al. .................... 717/100
2009/0089660 A1 * 4/2009 Atkins et al. .................. 715/243
2009/0135180 A1 * 5/2009 Li ................................. 345/420

FOREIGN PATENT DOCUMENTS

JP 04216183 A * 8/1992
JP 2001-188525 A 7/2001
JP 2002-354367 A 12/2002
JP 2005-50051 A 2/2005
JP 2005-223854 A 8/2005

* cited by examiner

*Primary Examiner* — James A Thompson
*Assistant Examiner* — David H Chu
(74) *Attorney, Agent, or Firm* — Birch, Stewart, Kolasch & Birch, LLP

(57) ABSTRACT

An area dividing section divides a display area into two areas having random dimensions. One of the divided display areas is further divided into two with random dimensions. This division is continued until the number of divided display areas reaches the number of content information to be displayed.

16 Claims, 10 Drawing Sheets

CONTENT DISPLAY METHOD, CONTENT DISPLAY PROGRAM AND CONTENT DISPLAY DEVICE

FIELD OF THE INVENTION

The present invention relates to a method, a program and a device for displaying multiple pieces of content information in list form.

BACKGROUND OF THE INVENTION

Images captured with a digital camera or a camera phone are normally taken into a personal computer (PC) and viewed on a monitor, or processed e.g. saved, edited, deleted or the like. In the image processing like editing, a list of thumbnail images that are reduced images is displayed on the monitor for selecting an image (see, for example, Japanese Patent Laid-open Publication No. 2005-223854).

Various types of content information, besides the images taken with the digital camera or the camera phone, are displayed in list form on the monitor. The content information include both motion and still images, web pages, logos and the like obtained through the internet. On the internet, enormous amounts of content information are constantly been uploaded, and they can be obtained in real time. Therefore, different content information can be displayed in list form every time users access to the internet.

Accompanying information such as keywords can be attached as a tag to each piece of content information. Such tags are shown in list form on the internet. The list of tags is called a tag cloud. In the tag cloud, weight is allocated to each tag based on, for example, search frequency and the weight of the tag is shown with its font size or color.

To emphasize particular images in a list display, images are often laid out with different sizes. There are, for example, a method limiting a region where images can be overlapped (see, for example, Japanese Patent Laid-open Publication No. 2001-188525), a method using a template (see, for example, Japanese Patent Laid-open Publication No. 2005-050051), and a method showing priorities of images (see, for example, Japanese Patent Laid-open Publication No. 2002-354367).

In the invention according to JP-A 2001-188525, however, an image is inserted to an empty region of a displayed image on a monitor, and the invention does not aim to display a plurality of images in list form. In the invention according to JP-A 2005-050051, a plurality of images is displayed only with a predetermined layout, and therefore randomness of the image layout cannot be assured. In the invention according to JP-A 2002-354367, images are laid out regularly in order to show their priories, which results in poor visual features.

SUMMARY OF THE INVENTION

It is an object of the present invention to provide a content display method, a content display program and a content display device capable of displaying a list of multiple pieces of content information with different display sizes in an irregular layout.

In order to achieve the above and other objects, a content display method according to the present invention includes a first dividing step, a second dividing step, and a layout step. In the first dividing step, a display area is divided into two divided display areas. In the second dividing step, one of the divided display areas is selected and the selected divided display area is further divided into two divided display areas. This second dividing step is repeated until a predetermined completion condition is satisfied. In the layout step, the multiple pieces of content information are laid out in order to display the corresponding content information in each divided display area.

It is preferable that the completion condition is satisfied when the number of the divided display areas reaches a predetermined number.

It is preferable that a content determining step and a counting step are further included. In the content determining step, content information to be displayed in list form is determined before the first dividing step. In the counting step, the number of the determined content information is counted. The completion condition is preferably satisfied when the number of the divided display areas reaches the number of the determined content information to be displayed.

The completion condition can also be satisfied when dimension of each divided display area becomes smaller than a predetermined value. In the second dividing step, the divided display area to be divided is preferably selected according to a predetermined selection standard. In this case, the selection standard is preferably to select the divided display area having largest dimension.

It is preferable that the first dividing step and the second dividing step respectively includes a direction determining step, an aspect ratio estimating step, a judging step, a position determining step, and a dividing step. In the direction determining step, aspect ratio of an area is calculated and direction to divide the area is determined based on the calculated value. In the aspect ratio estimating step, position to divide within the area is tentatively determined and aspect ratio of each area in case where the area is divided into two at the tentative position is estimated. In the judging step, whether the aspect ratio of each area estimated in the aspect ratio estimating step is in a predetermined range is judged. In the position determining step, it is determined to divide the area at the tentative position when the aspect ratio of each area is in the predetermined range. In the dividing step, the area is divided into two in the direction determined in the direction determining step at the position determined in the position determining step. The dividing position is preferably determined by repeating the aspect ratio estimating step and the judging step until the aspect ratio of each area is judged to be in the predetermined range.

The direction to divide the area is preferably a vertical direction or a horizontal direction.

It is preferable that the content display method further includes a value assigning step, an area ranking step, and an allocating step. In the value assigning step, aspect ratio of each piece of content information is calculated and the calculated value is assigned to the content information. In the area ranking step, the divided display areas are ranked according to a predetermined standard. In the allocating step, aspect ratio of each display area is calculated in the ranked order and one of the content information having closest aspect ratio is allocated to the divided display area.

The divided display areas are preferably ranked according to their dimensions in the area ranking step.

It is preferable that the content display method further includes a content ranking step, an area ranking step, and an allocating step. In the content ranking step, the multiple pieces of content information are ranked according to a predetermined standard. In the area ranking step, the divided display areas are ranked according to a predetermined standard. In the allocating step, the multiple pieces of content information are allocated to the divided display areas in the ranked order.

A value assigning step can be provided before the content ranking step. In the value assigning step, a predetermined value is assigned to each piece of content information. The multiple pieces of content information are ranked according to the assigned predetermined values.

The divided display areas are preferably ranked according to their dimensions in the area ranking step.

A content display program according to the present invention includes a first dividing step, a second dividing step, and a layout step. In the first dividing step, a display area is divided into two divided display areas. In the second dividing step, one of the divided display areas is selected and the selected divided display area is further divided into two divided display areas. This second dividing step is repeated until a predetermined completion condition is satisfied. In the layout step, the multiple pieces of content information are laid out in order to display the corresponding content information in each divided display area.

A content display device according to the present invention includes a first dividing section, an area selecting section, a second dividing section, and a layout section. The first dividing section divides a display area into two divided display areas. The area selecting section selects one of the divided display areas. The second dividing section further divides the selected divided display area into two divided display areas. The area selection by the area selecting section and the division by the second dividing section are repeated until a predetermined completion condition is satisfied. The layout section lays out the multiple pieces of content information to display the corresponding content information in each divided display area.

According to the present invention, the division of the display area is continued until satisfying the predetermined completion condition. Owing to this, multiple pieces of content information having different display sizes can be displayed in list form with irregular layout.

In addition, content information to be displayed in list form is determined, the number of the determined content information is counted, and the completion condition is set to be satisfied when the number of the divided display areas reaches the number of the determined content information to be displayed. Owing to this, the display area with layout that corresponds to the number of the content information to be displayed can be automatically produced.

In addition, the content information having closest aspect ratio is allocated to each divided display area, and this allocation is performed in decreasing order of dimensions of the divided display areas. After the allocation, each piece of content information is displayed in the allocated display area. Owing to this, the larger the display dimension of the content information is, the closer aspect ratio to the original the content information can maintain.

In addition, the multiple pieces of content information are ranked according to the predetermined standard, while the divided display areas are ranked according to their dimensions in decreasing order. The multiple pieces of content information are allocated to the divided display areas in the ranked order, and each piece of content information is displayed in the allocated display area. Owing to this, main content information can be emphasized in the list display.

In addition, the dividing direction is determined based on the aspect ratio of the area to divide, while the dividing position is determined by estimating the aspect ratio of each divided area after the division, and the area is divided in the determined direction at the determined position. Owing to this, the content information is prevented from being too long vertically or horizontally after the division.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

[First Embodiment]

Figure 1:
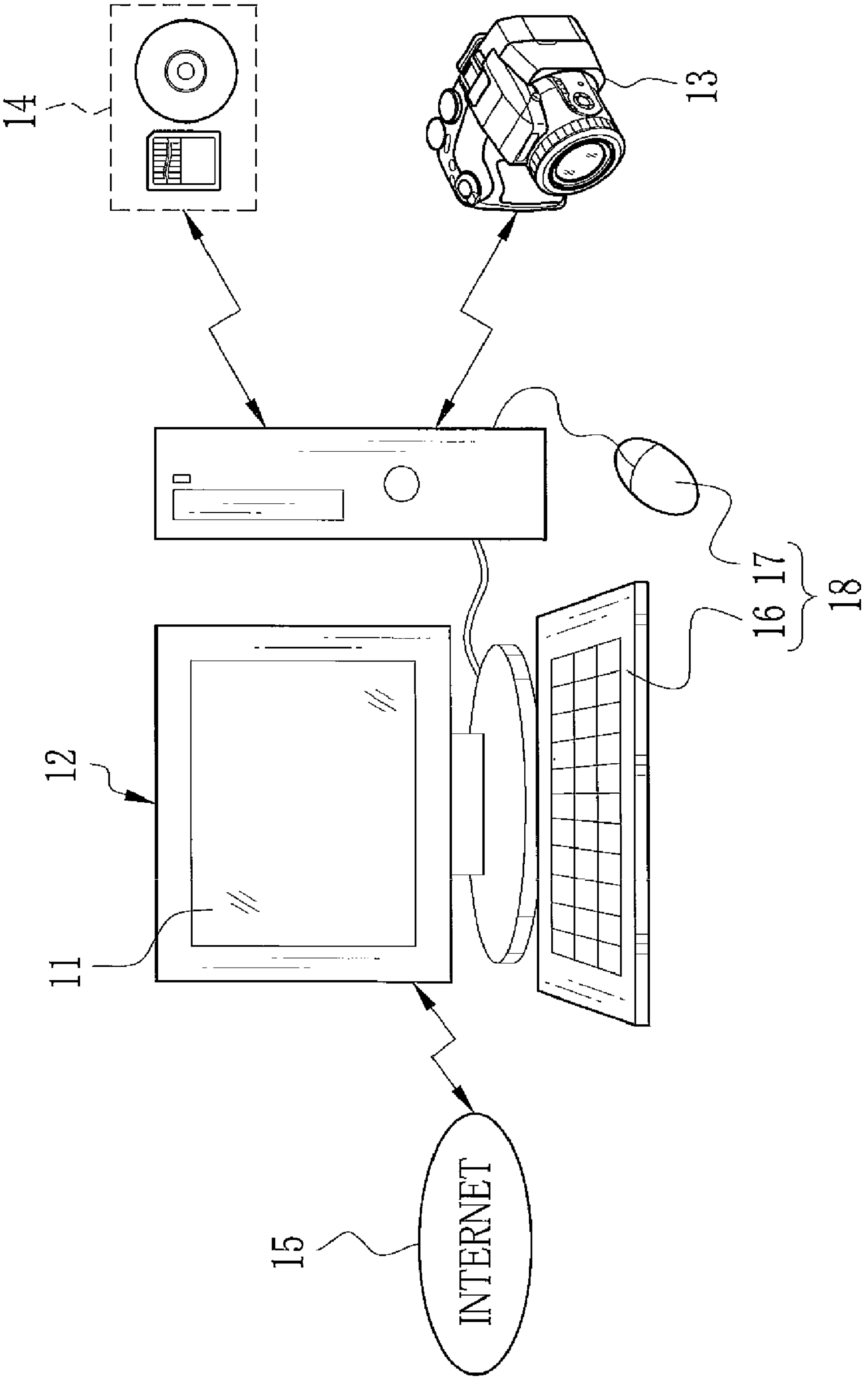
FIG. 1 is a schematic view illustrating the structure of a content display device.

In FIG. 1, a content display device displays multiple pieces of content information (hereinafter, merely referred to as "content") in list form on a monitor 11, and realized when a content display program stored in a recording medium like a CD-ROM is installed to, for example, a personal computer (PC) 12. The content include motion and still images captured with a digital camera 13, images recorded in a recording medium 14 like a CD-R, images, web pages, logos and the like obtained through internet 15, or any others as long as they are visually displayed. In this specification, images are the content.

The digital camera 13 is connected to the PC 12 by wireless LAN or a communication cable complying with, for example, IEEE 1394 or Universal Serial Bus (USB). The digital camera 13 and the PC 12 can communicate data. The recording medium 14 is also capable of communicating data with the PC 12 through a specific driver.

Figure 2:
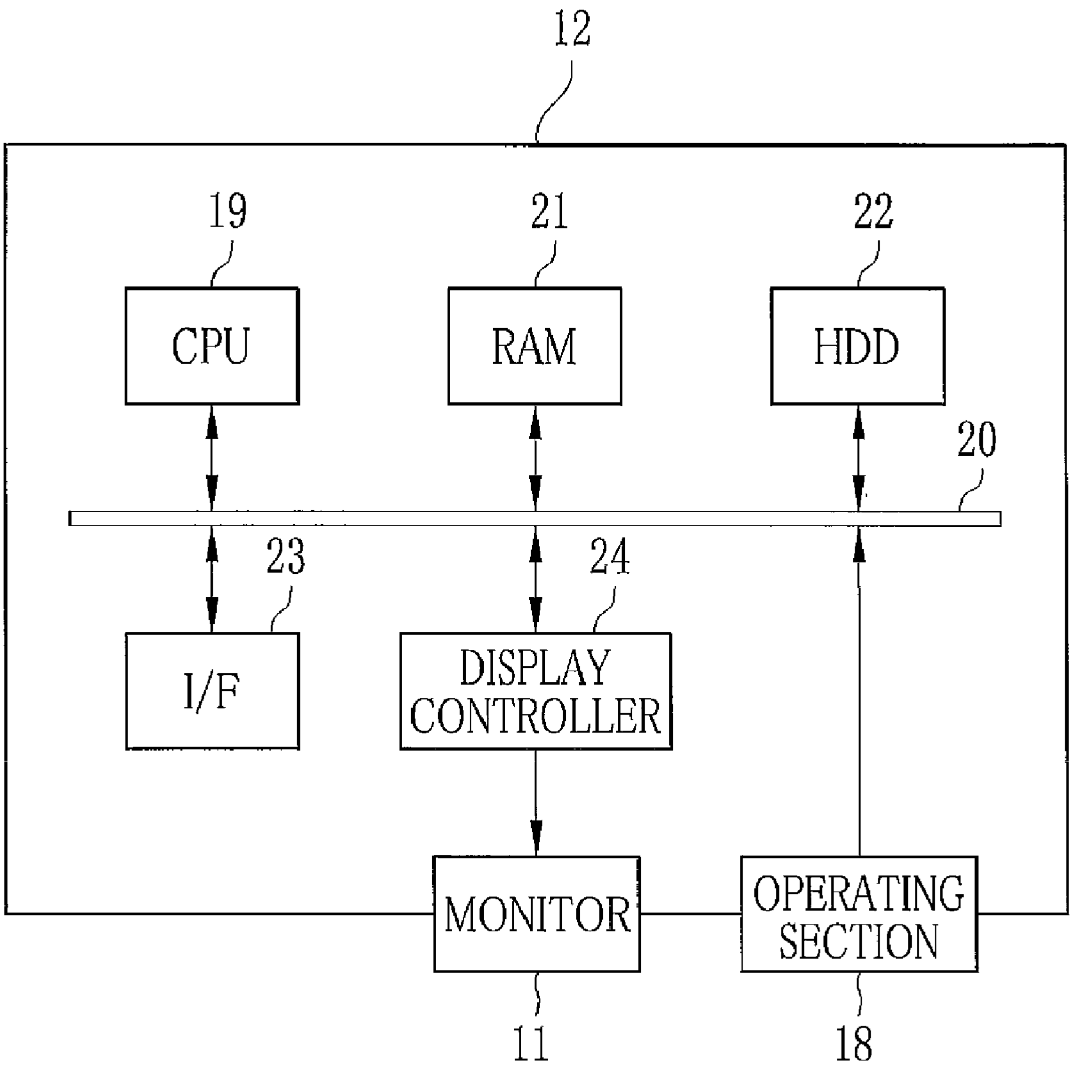
FIG. 2 is a block diagram illustrating the structure of a personal computer.

The PC 12 is provided with the monitor 11 for displaying images in list form as well as various operation screens and an operation section 18 constituted of a keyboard 16 and a mouse 17. A user operates the operation section 18 while observing the operation screens on the monitor 11. As shown in FIG. 2, a CPU 19 entirely controls the PC 12 according to operation signals coming from the operation section 18. Besides the operation section 18, a RAM 21, a HDD 22, a communication I/F 23, and a display controller 24 are connected to the CPU 19 through a data bus 20.

The HDD 22 stores various programs for operating the PC 12, including the content display program, and data. The HDD 22 also stores multiple image data loaded from the digital camera 13, the recording medium 14, and through the internet 15. The CPU 19 reads out the program from the HDD 22 and deploys the program in the RAM 21. The CPU 19 sequentially executes the loaded programs. The CPU 19 also operates each element of the PC 12 according to the operation signals coming from the operation section 18.

The communication I/F 23 mediates the data communication of the PC 12 with the internet 15 or external devices like the digital camera 13. The display controller 24 controls the monitor 11 to display various operation screens and images as the content in list form.

Figure 3:
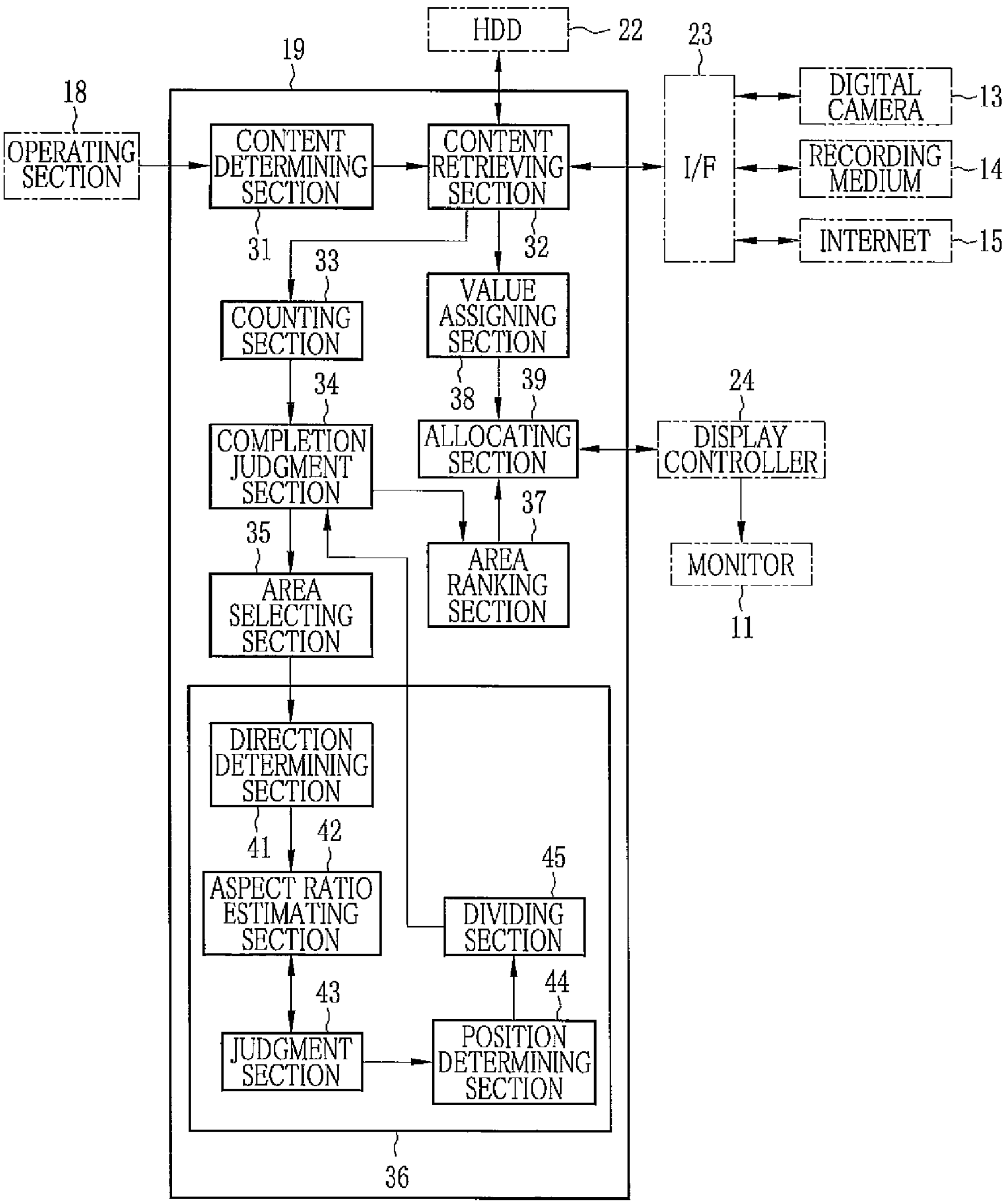
FIG. 3 is a functional block diagram illustrating a CPU.

When the content display program is executed by operating the operation section 18, a system shown in FIG. 3 is constructed in the CPU 19. This system is constituted of a content determining section 31, a content retrieving section 32, a counting section 33, a completion judgment section 34, an area selecting section 35, an area dividing section 36, an area ranking section 37, a value assigning section 38, and an allocating section 39.

The content determining section 31 determines genre of images to be displayed in list form based on keywords input from the operation section 18. Specifically, related words of the input keywords are produced, and the keywords and the related words are input to the content retrieving section 32. For example, when the keyword "fireworks" is input, related words like "catharine wheel", "set fireworks" and the like are produced, and the keyword and the related words are input to the content retrieving section 32. When the number of images to be displayed is input from the operation section 18, the content determining section 31 outputs the number to the content retrieving section 32 as well.

Upon receiving the keywords and the related words, the content retrieving section 32 retrieves images having the input keywords and the related words as the accompanying information from the HDD 22. The maximum number of images that the content retrieving section 32 retrieves is predetermined according to the size of the monitor 11. When the number of images to be displayed is designated from the operation section 18, this number is set as the maximum number. When the number of images having the input keywords and the related words as the accompanying information exceeds the maximum number, images are selected based on the accompanying information such as the number of times the image has been viewed (viewed number), registered date, renewed date, image capacity, image dimension and the like.

The counting section 33 counts the number of images retrieved by the content retrieving section 32, and outputs the number to the completion judgment section 34. The completion judgment section 34 judges whether the number of display areas divided by the area dividing section 36 has reached the number of images to be displayed. The division of the display area by the area dividing section 36 is explained later in detail. When judged that the number of divided display areas has not reached the number of images to be displayed, the completion judgment section 34 sends a command to further divide the display area to the area dividing section 36 via the area selecting section 35.

The area dividing section 36 is constituted of a direction determining section 41, an aspect ratio estimating section 42, a judgment section 43, a position determining section 44, and a dividing section 45, and divides the display area selected by the area selecting section 35 into two. The area selecting section 35 selects the display area having largest dimension, and the area dividing section 36 divides the selected display area. When there is only one display area, however, the area selecting section 35 selects this display area, and the area dividing section 36 divides this area into two.

The direction determining section 41 determines the direction of a straight division line for dividing the display area into two. This determination is made in consideration of aspect ratio (AR=vertical length/horizontal length) of the display area before the division. When the display area is vertically long ($1 \leqq AR$), the direction of the division line is set horizontal. When the display area is horizontally long ($AR<1$), the direction of the division line is set vertical. Owing to this, the display area is prevented from becoming vertically or horizontally longer after the division. Although the direction of the division line is preliminarily set to the vertical direction or the horizontal direction, the direction can be changed to an oblique direction by operating the operation section 18. In addition, the preliminarily set division line is straight, but the line can be changed to be curbed or jagged by operating the operation section 18.

The aspect ratio estimating section 42 tentatively sets the position of the division line whose direction has been determined by the direction determining section 41. At this time, the position is randomly set. The aspect ratio estimating section 42 estimates the aspect ratio of each divided display area on the assumption that the display area is divided by the division line at the tentatively set position, and outputs the estimated values to the judgment section 43. The judgment section 43 judges whether the estimated values are in the predetermined range, for example, $0.2 \leqq AR \leqq 5$. When the estimated values are outside the range, the judgment section 43 let the aspect ratio estimating section 42 continues the operation of tentatively setting the position of the division line until the estimated values meet the range. When the judgment section 43 judges as the estimated values are within the range, the position determining section 44 determines the tentative position set by the aspect ratio estimating section 42 as the position of the division line.

The dividing section 45 divides the display area into two by the division line in the direction determined by the direction determining section 41 and at the position determined by the position determining section 44.

When the completion judgment section 34 judges the number of display areas divided by the area dividing section 36 has reached the number of images to be displayed, the area ranking section 37 ranks the divided display areas according to their dimensions in decreasing order. Meanwhile, the value assigning section 38 calculates the aspect ratio of each image retrieved by the content retrieving section 32 and assigns the calculated value to each image. The allocating section 39 allocates the images to respective divided display areas in ranked order. Specifically, the aspect ratio of each divided display area is calculated, and the image having closest aspect ratio is allocated to each area. In this way, the images are sequentially allocated to the divided display areas in ranked order. Owing to this, the larger the display dimension of the image is, the closer aspect ratio to the original the image can maintain.

The display controller 24 displays images in list form on the monitor 11 by displaying each image in the corresponding display area allocated by the allocating section 39.

Hereinafter, processing steps of the content display device according to a first embodiment is explained. When the content display program is executed, the system constituted of the content determining section 31, the content retrieving section 32, the counting section 33, the completion judgment section 34, the area selecting section 35, the area dividing section 36, the area ranking section 37, the value assigning section 38, and the allocating section 39 is constructed in the CPU 19.

The user inputs desired keywords like, for example, "fireworks" by operating the operation section 18. When the keyword is input, the content determining section 31 produces related words of the input keyword. In this case, for example, the related words "catharine wheel" and "set fireworks" are produced. Then, the keyword and the related words are output to the content retrieving section 32.

Figure 4:
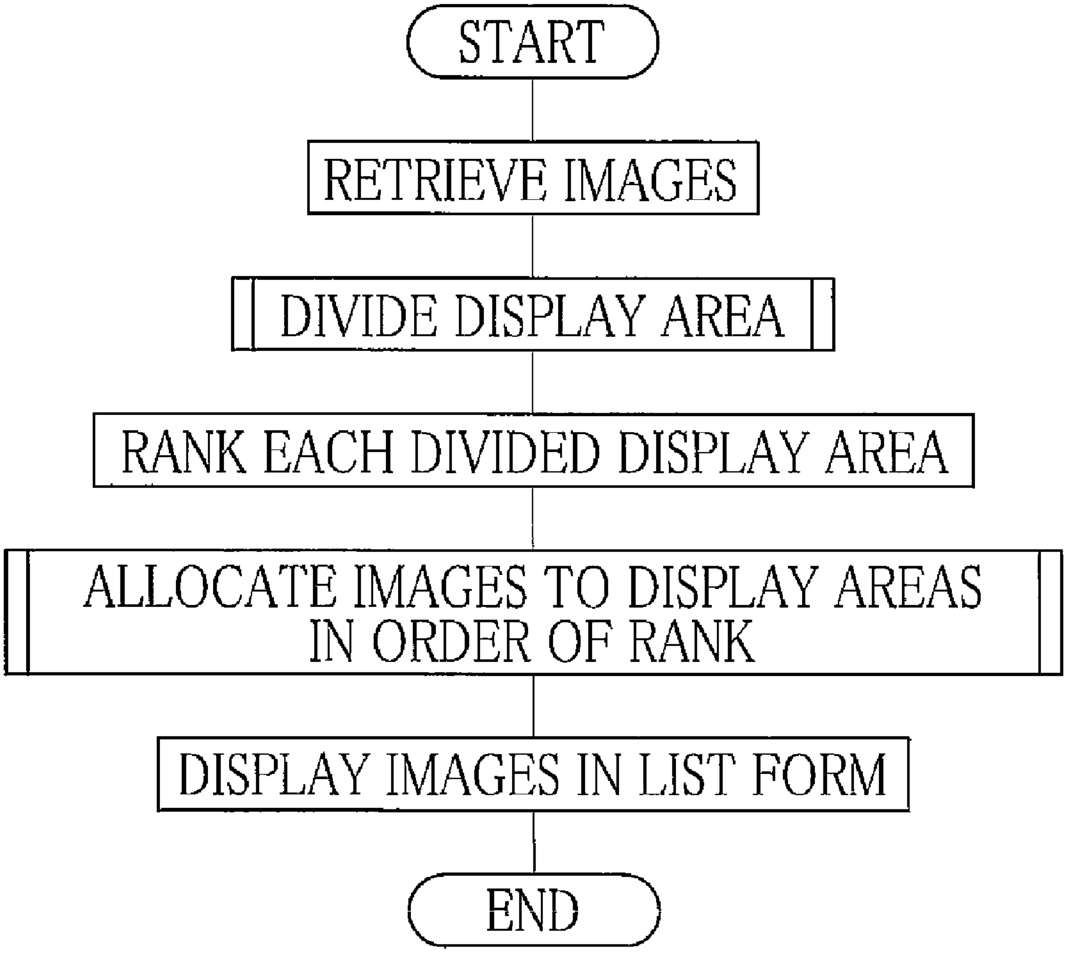
FIG. 4 is a flow chart showing processing steps of the content display device.

As shown in FIG. 4, the content retrieving section 32 retrieves images having the keyword "fireworks" and the related words "catharine wheel" and "set fireworks" as the accompanying information from the HDD 22. The number of the images retrieved is up to the predetermined number. The number of the retrieved images is counted by the counting section 33 and the number is sent to the completion judgment section 34.

The completion judgment section 34 sets a completion condition satisfied when the number of divided display areas reaches the number of images counted by the counting section 33. Until this completion condition is satisfied, the completion judgment section 34 sends a command to divide the display area to the area dividing section 36 via the area selecting section 35.

Figure 5:
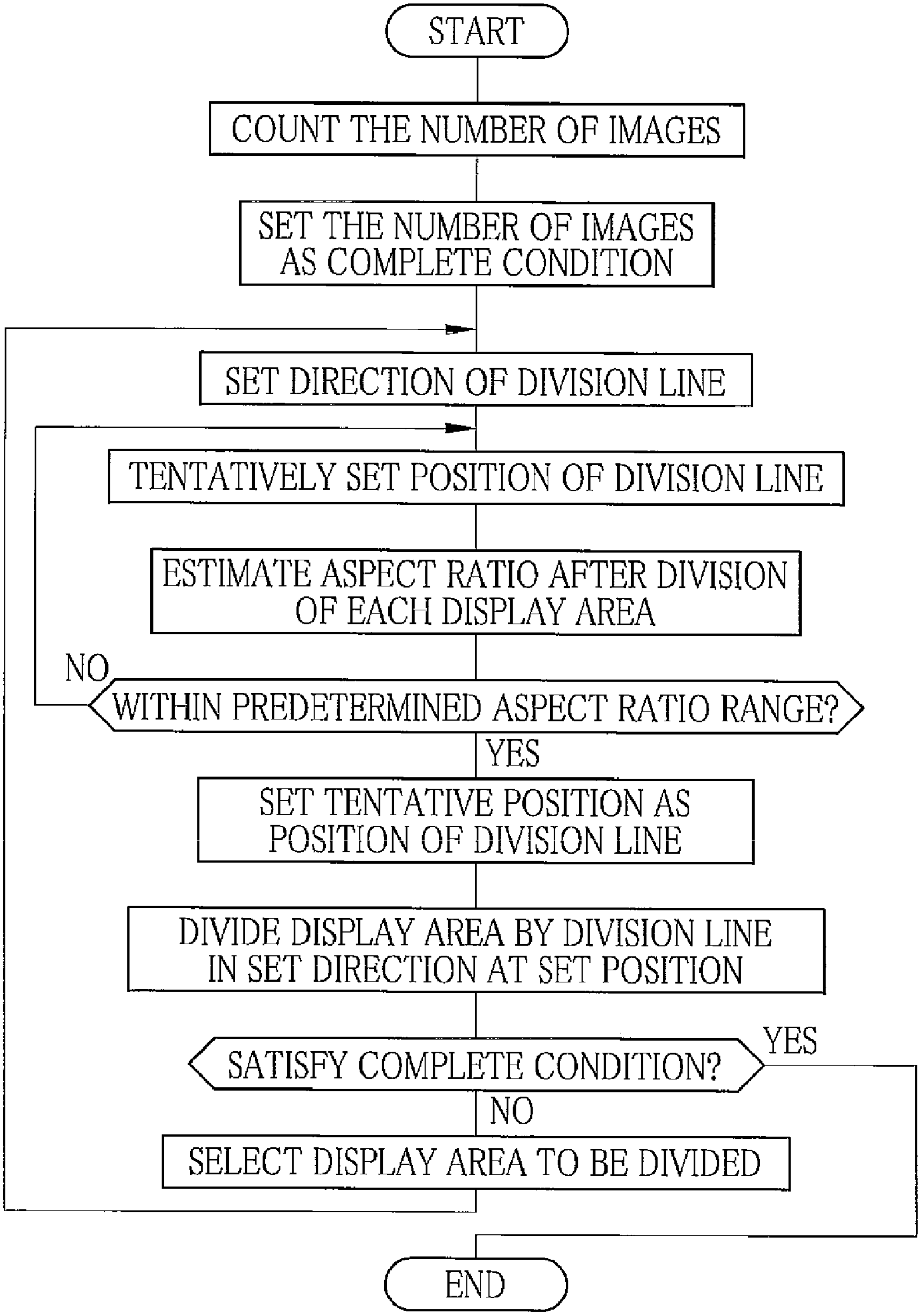
FIG. 5 is a flow chart showing processing steps of an area dividing section.

Specifically, as shown in FIG. 5, the direction determining section 41 determines the direction of the division line and the position determining section 44 determines the position of the same. The dividing section 45 divides the display area into two by the division line in the direction determined by the direction determining section 41 and at the position determined by the position determining section 44. Until satisfying the completion condition, the display area with largest dimension is continuously selected by the area selecting section 35 and divided into two.

Figures 6A, 6B, 6C, 6D, 6E, 6F:
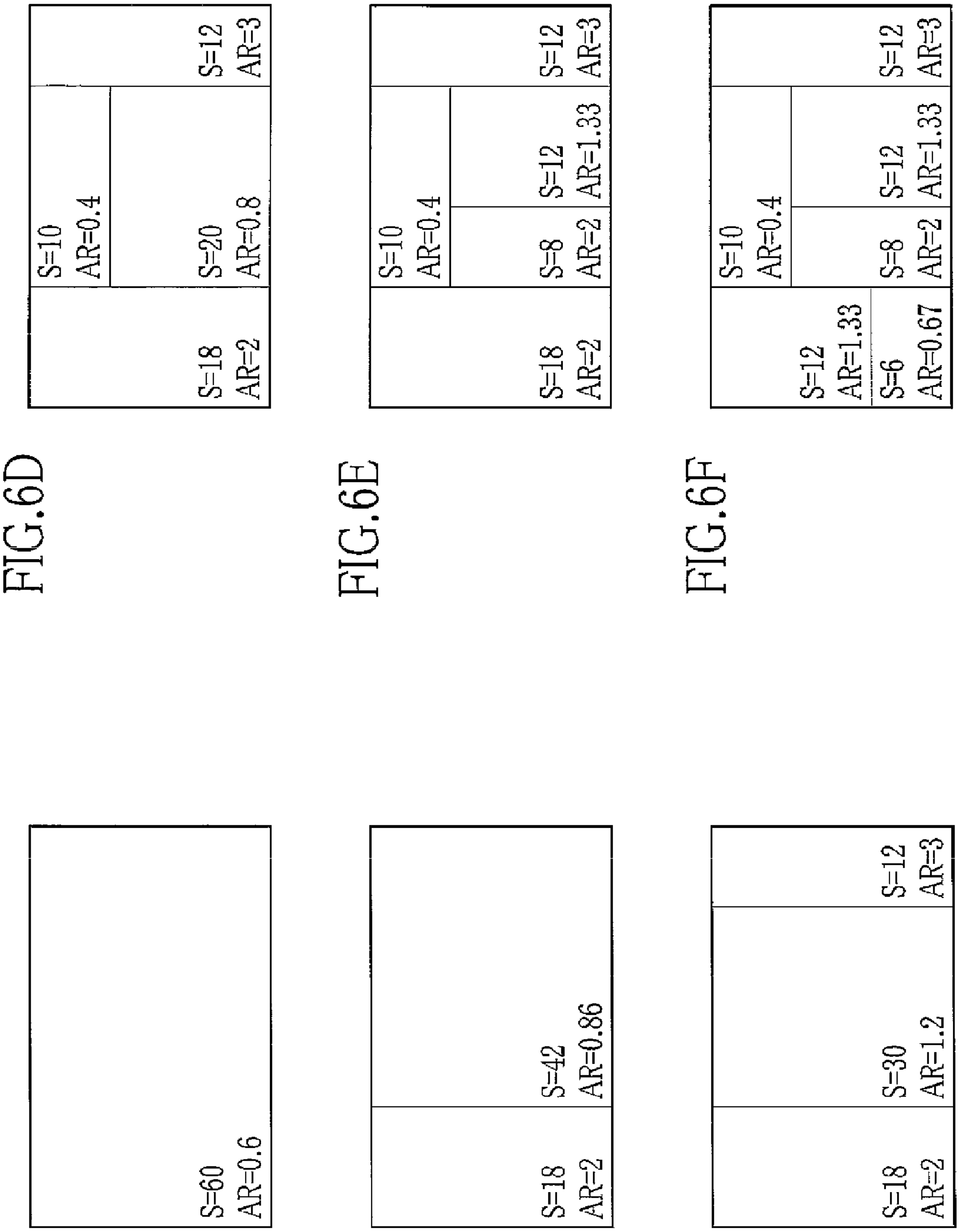
FIGS. 6A, 6B, 6C, 6D, 6E, and 6F are explanatory views respectively illustrating display areas divided with different dimensions and aspect ratios.

Here, an example of dividing the display area is explained with a case where an original display area whose dimension (S) is "60" and aspect ratio is "0.6" (AR=6/10) shown in FIG. 6A is divided into six areas. First, the area selecting section 35 selects the original display area. Since the original display area has the aspect ratio of "0.6" and is horizontally long, the direction determining section 41 sets the direction of the division line vertical. While estimating the aspect ratio after division of each divided display area, the position determining section 44 randomly sets the position of the division line. The dividing section 45 divides the original display area into two areas: one has dimension of "18" and aspect ratio of "2" (AR=6/3) and the other has dimension of "42" and aspect ratio of "0.86" (AR is almost equal to 6/7), as shown in FIG. 6B. Since the number of the divided display areas is two (<6), the completion judgment section 34 let the area selecting section 35 to select the display area having the largest dimension among the two.

The area selecting section 35 selects the display area having dimension of "42" and aspect ratio of "0.86" (AR is almost equal to 6/7). Since this display area has the aspect ratio of "0.86" and is horizontally long, the direction determining section 41 sets the direction of the division line vertical. While estimating the aspect ratio after division of each divided display area, the position determining section 44 randomly sets the position of the division line. The dividing section 45 divides the display area into two areas: one has dimension of "30" and aspect ratio of "1.2" (AR=6/5) and the other has dimension of "12" and aspect ratio of "3" (AR=6/2), as shown in FIG. 6C. Since the number of the divided display areas is three (<6), the completion judgment section 34 let the area selecting section 35 to select the display area having the largest dimension among the three.

The area selecting section 35 selects the display area having dimension of "30" and aspect ratio of "1.2" (AR=6/5). Since this display area has the aspect ratio of "1.2" and is vertically long, the direction determining section 41 sets the direction of the division line horizontal. While estimating the aspect ratio after division of each divided display area, the position determining section 44 randomly sets the position of the division line. The dividing section 45 divides the display area into two areas: one has dimension of "10" and aspect ratio of "0.4" (AR=2/5) and the other has dimension of "20" and aspect ratio of "0.8" (AR=4/5), as shown in FIG. 6D. Since the number of the divided display areas is four (<6), the completion judgment section 34 let the area selecting section 35 to select the display area having the largest dimension among the four.

The area selecting section 35 selects the display area having dimension of "20" and aspect ratio of "0.8" (AR=4/5). Since this display area has the aspect ratio of "0.8" and is horizontally long, the direction determining section 41 sets the direction of the division line vertical. While estimating the aspect ratio after division of each divided display area, the position determining section 44 randomly sets the position of the division line. The dividing section 45 divides the display area into two areas: one has dimension of "8" and aspect ratio of "2" (AR=4/2) and the other has dimension of "12" and aspect ratio of "1.33" (AR is almost equal to 4/3), as shown in FIG. 6E. Since the number of the divided display areas is five (<6), the completion judgment section 34 let the area selecting section 35 to select the display area having the largest dimension among the five.

The area selecting section 35 selects the display area having dimension of "18" and aspect ratio of "2" (AR=6/3). Since this display area has the aspect ratio of "2" and is vertically long, the direction determining section 41 sets the direction of the division line horizontal. While estimating the aspect ratio after division of each divided display area, the position determining section 44 randomly sets the position of the division line. The dividing section 45 divides the display area into two areas: one has dimension of "12" and aspect ratio of "1.33" (AR is almost equal to 4/3) and the other has dimension of "6" and aspect ratio of "0.67" (AR is almost equal to 2/3), as shown in FIG. 6F. Since the number of the divided display areas has reached six, the completion judgment section 34 judges as the completion condition is satisfied.

Figure 7:
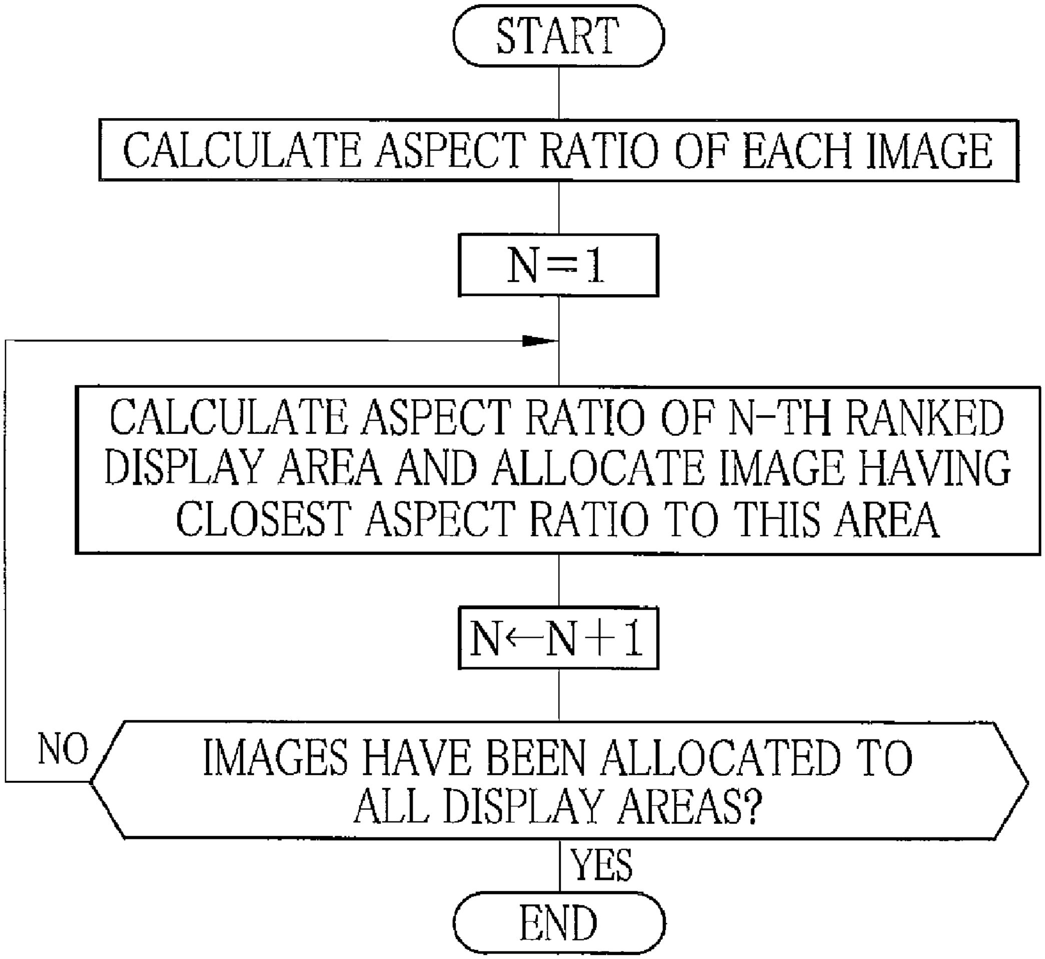
FIG. 7 is a flow chart showing processing steps of an allocating section.

When it is judged that the completion condition is satisfied, the area ranking section 37 ranks the divided display areas according to their dimensions in decreasing order. As shown in FIG. 7, the allocating section 39 calculates the aspect ratio of each display area in ranked order, and allocates the image having closest aspect ratio to each area.

Figure 8:
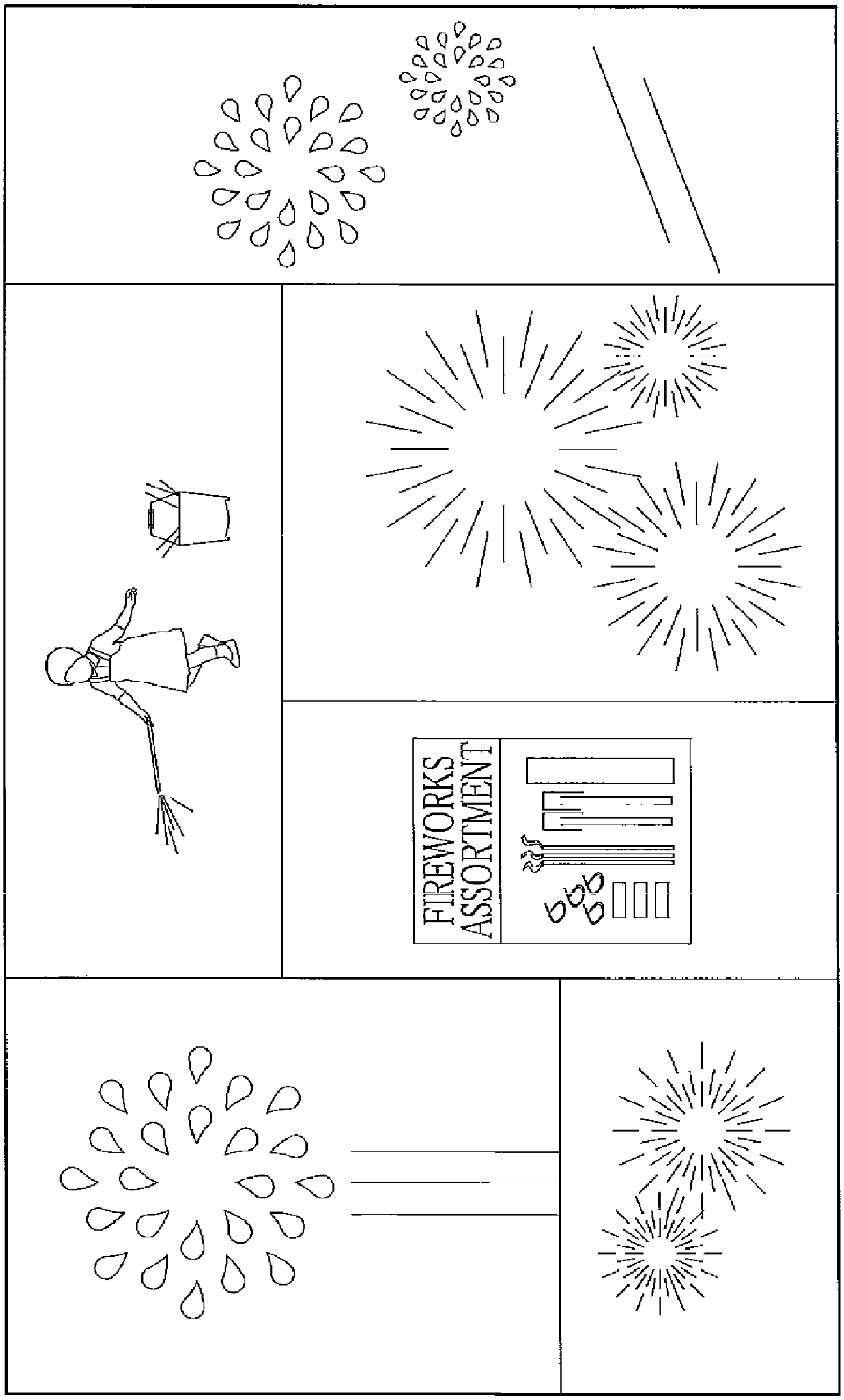
FIG. 8 is an explanatory view illustrating a display area in which images are displayed in list form.

The display controller 24 displays images in list form by displaying each image in the allocated display area. FIG. 8 shows an example in which images are respectively displayed in the corresponding display areas shown in FIG. 6F.

According to the first embodiment, the larger the display dimension of the image is, the closer aspect ratio to the original the image can maintain. It is also possible that the display dimensions are varied depending on the importance of the images in a content display device according to a second embodiment explained hereinafter.

[Second Embodiment]

Figure 9:
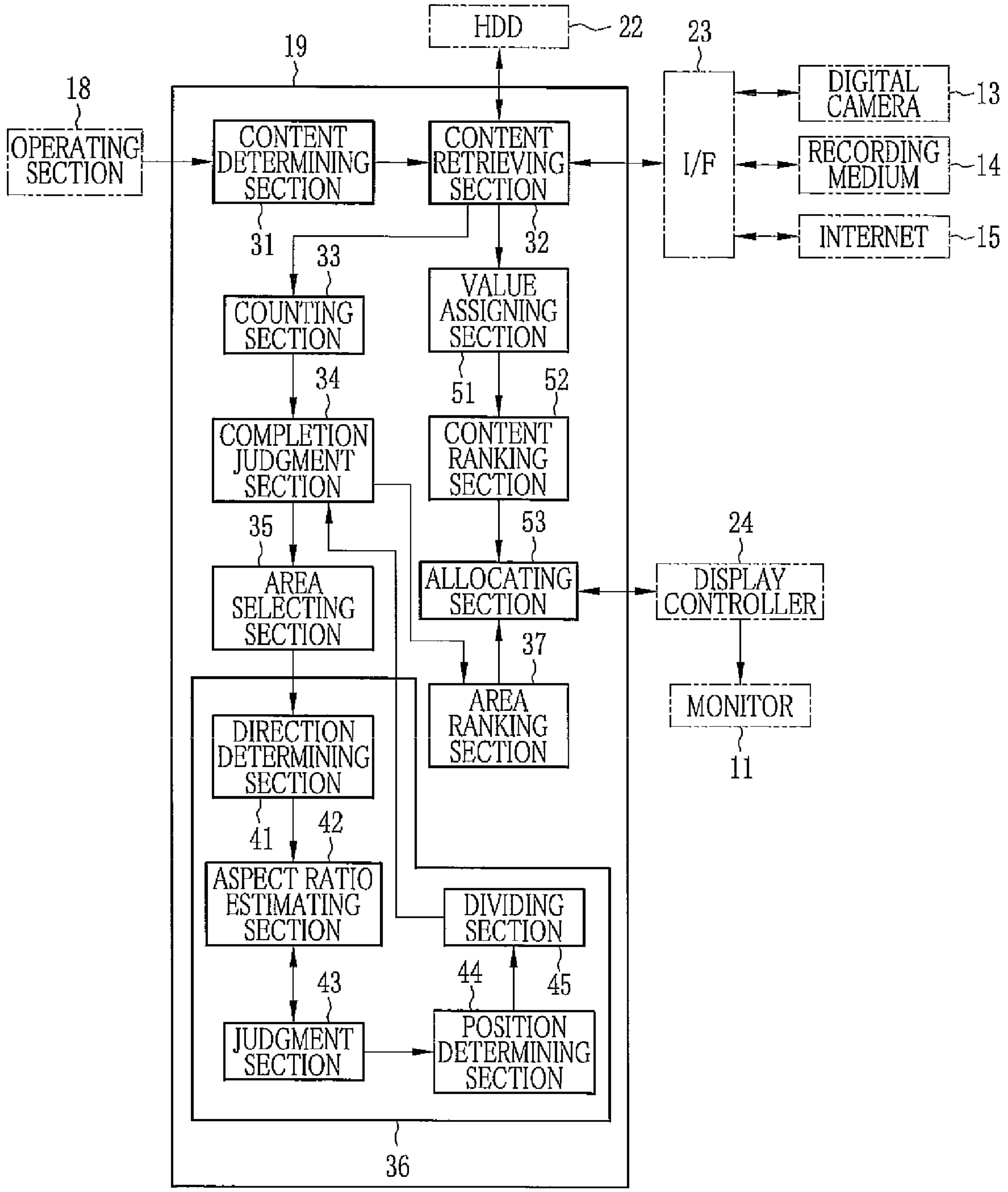
FIG. 9 is a functional block diagram illustrating a CPU according to a second embodiment of the present invention.

When the content display program is executed by operating the operation section 18, a system shown in FIG. 9 is constructed in the CPU 19. This system is constituted of the content determining section 31, the content retrieving section 32, the counting section 33, the completion judgment section 34, the area selecting section 35, the area dividing section 36, the area ranking section 37, a value assigning section 51, a content ranking section 52, and an allocating section 53.

The value assigning section 51 reads out the viewed number of each image retrieved by the content retrieving section 32 and assigns the viewed number as its value to each image. The content ranking section 52 ranks the images in decreasing order according to their values. The allocating section 53 allocates the images ranked by the content ranking section 52 to respective display areas in ranked order ranked by the area ranking section 37. Specifically, the image ranked first is allocated to the display area ranked first, the image ranked second is allocated to the display area ranked second, and so on. For this configuration, the more the image is viewed, the larger the display dimension of the image becomes.

The display controller 24 displays images in list form by displaying a screen in which each image is allocated to the corresponding display area. Note that the same components as the first embodiment are assigned with the same numerals, and detailed explanations thereof are omitted.

Hereinafter, processing steps of the content display device according to the second embodiment is explained. When the content display program is executed, the system constituted of the content determining section 31, the content retrieving section 32, the counting section 33, the completion judgment section 34, the area selecting section 35, the area dividing section 36, the area ranking section 37, the value assigning section 51, the content ranking section 52, and the allocating section 53 is constructed in the CPU 19.

When keywords are input by operating the operation section 18, the content determining section 31 produces related words of the keywords, and the keywords and the related words are output to the content retrieving section 32.

Figure 10:
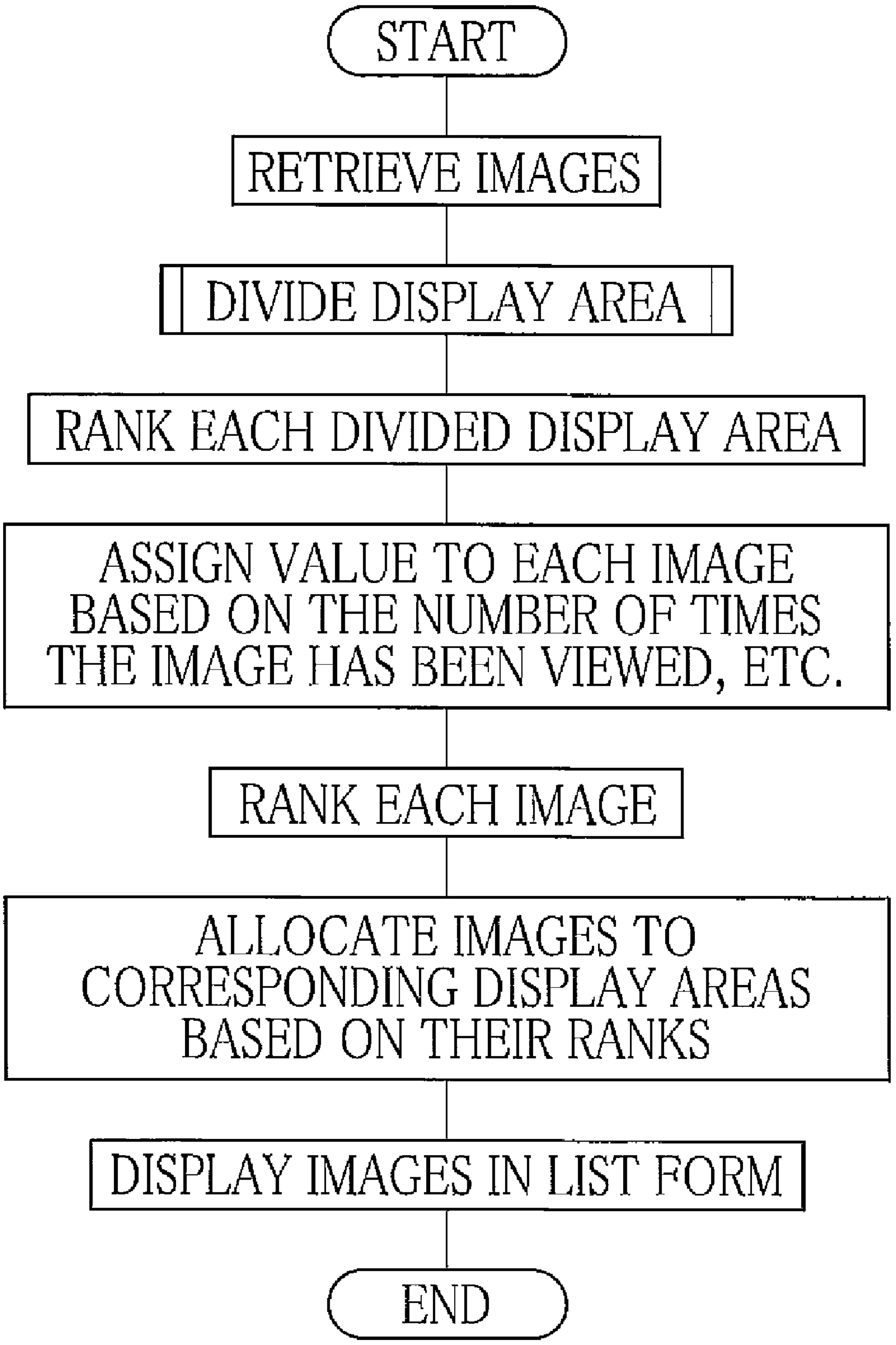
FIG. 10 is a flow chart showing processing steps of the content display device according to the second embodiment of the present invention.

As shown in FIG. 10, the content retrieving section 32 retrieves images having the input keywords and the related words as the accompanying information from the HDD 22. The number of the images retrieved is up to the predetermined number. The number of the retrieved images is counted by the counting section 33. The area dividing section 36 divides the display area based on the number of images counted (see FIG. 5). The area ranking section 37 ranks the divided display areas according to their dimensions in decreasing order. Meanwhile, the value assigning section 51 reads out the viewed number of each image retrieved by the content retrieving section 32. The viewed number is assigned as its value to each image. The content ranking section 52 ranks the images in decreasing order according to their values.

When the ranking of the display areas by the area ranking section 37 and the ranking of the images by the content ranking section 52 are completed, the allocating section 53 allocates each image to the corresponding display area in ranked order.

The display controller 24 displays images in list form on the monitor 11 by displaying each image in the allocated display area.

In the above embodiments, the images retrieved from the HDD 22 are displayed in list form. However, it is also possible to display a list of images obtained from the digital camera 13, the recording medium 14, the internet 15, and the like via the communication I/F 23.

In the above embodiments, although the maximum number of images to be displayed in list form is preliminarily determined, the number is not necessarily limited.

In the above embodiments, the completion condition is satisfied when the number of divided display areas reaches the predetermined number. However, it is also possible that the completion condition is satisfied when, for example, the display dimension of each divided display area becomes smaller than a predetermined value.

In the above embodiments, although the area selecting section 35 selects the display area having largest display area, the area selecting section 35 may selects a display area randomly or according to other standards.

In the above embodiments, although the direction of the division line is determined in consideration of the aspect ratio of the display area, the direction may be determined randomly or according to other standards.

In the above embodiments, although the position of the division line is tentatively determined in a random manner, the position may be determined according to other standards.

In the above embodiments, although the divided display areas are ranked according to their dimensions in decreasing order, the divided display areas may be ranked according to their dimensions in ascending order, or according to other standards.

In the above embodiments, the list of images is displayed with no spaces provided between the adjacent images. However, it is possible to provide a predetermined width of margin between the images, to provide each image with a frame, to display the image with its corner rounded off, or the like.

In the second embodiment, the value assigning section 51 assigns the viewed number as the value to each image. However, it is also possible to assign value based on other accompanying information such as the registered date, renewed date, image capacity, image dimension, a combination thereof, and the like. The accompanying information is not limited as long as it is unique information to each image.

Various changes and modifications are possible in the present invention and may be understood to be within the present invention.

What is claimed is:

1. A content display method in a processing unit for laying out and displaying multiple pieces of content information on a display device comprising:

a first dividing step using an area dividing section in said processing unit for dividing a display area on said display device into two divided display areas;

a second dividing step using the area dividing section for selecting one of said divided display areas having a largest dimension among all of said divided display areas on said display device and further dividing the selected divided display area into two divided display areas, said second dividing step being repeated until a predetermined completion condition is satisfied; and a layout step for laying out said multiple pieces of content information to display the corresponding content information on said display device in each said divided display area a direction determining step for calculating aspect ratio of an area and determining direction to divide said area based on the calculated value; an aspect ratio estimating step for tentatively determining position to divide within said area and estimating aspect ratio of each area when said area is divided into two at said tentative position; a judging step for judging whether said aspect ratio of each area estimated in said aspect ratio estimating step is in a predetermined range; a position determining step for determining to divide said area at said tentative position when said aspect ratio of each area is in said predetermined range; and a dividing step for dividing said area into two in the direction determined in said direction determining step at the position determined in said position determining step, wherein said aspect ratio estimating step and said judging step are repeated to determine a position to divide until said aspect ratio of every area is judged to be in said predetermined range.

2. The content display method of claim 1, wherein said completion condition is satisfied when the number of said divided display areas reaches a predetermined number.

3. The content display method of claim 1 further comprising:

a content determining step for determining content information to be displayed in list form before said first dividing step; and a counting step for counting the number of the determined content information, wherein said completion condition is satisfied when the number of said divided display areas reaches the number of the determined content information to be displayed.

4. The content display method of claim 1, wherein said completion condition is satisfied when dimension of each said divided display area becomes smaller than a predetermined value.

5. The content display method of claim 1, wherein said direction to divide said area is a vertical direction or a horizontal direction.

6. The content display method of claim 1 further comprising:

a value assigning step for calculating aspect ratio of each said content information and assigning the calculated value to each said content information;

an area ranking step for ranking said divided display areas according to a predetermined standard; and an allocating step for calculating aspect ratio of each said display area in the ranked order and sequentially allocating one of said content information having closest aspect ratio to said divided display area.

7. The content display method of claim 6, wherein said divided display areas are ranked according to their dimensions in said area ranking step.

8. The content display method of claim 5 further comprising:

a content ranking step for ranking said multiple pieces of content information according to a predetermined standard;

an area ranking step for ranking said divided display areas according to a predetermined standard; and an allocating step for allocating said multiple pieces of content information to said divided display areas in the ranked order.

9. The content display method of claim 8 further comprising:

a value assigning step for assigning a predetermined value to each said content information before said content ranking step, wherein said multiple pieces of content information are ranked according to the assigned predetermined values.

10. The content display method of claim 9, wherein said divided display areas are ranked according to their dimensions in said area ranking step.

11. A non-transitory computer-readable medium having stored thereon a computer executable content display program for laying out and displaying multiple pieces of content information comprising:

a first dividing step for dividing a display area into two divided display areas;

a second dividing step for selecting one of said divided display areas having a largest dimension among all of said divided display areas and further dividing the selected divided display area into two divided display areas, said second dividing step being repeated until a predetermined completion condition is satisfied; and a layout step for laying out said multiple pieces of content information to display the corresponding content information in each said divided display area, wherein said first dividing step and said second dividing step respectively including: a direction determining step for calculating aspect ratio of an area and determining direction to divide said area based on the calculated value; an aspect ratio estimating step for tentatively determining position to divide within said area and estimating aspect ratio of each area when said area is divided into two at said tentative position; a judging step for judging whether said aspect ratio of each area estimated in said aspect ratio estimating step is in a predetermined range; a position determining step for determining to divide said area at said tentative position when said aspect ratio of each area is in said predetermined range; and a dividing step for dividing said area into two in the direction determined in said direction determining step at the position determined in said position determining step, wherein said aspect ratio estimating step and said judging step are repeated to determine a position to divide until said aspect ratio of every area is judged to be in said predetermined range.

12. A content display device for laying out and displaying multiple pieces of content information comprising:

a first dividing section for dividing a display area into two divided display areas;

an area selecting section for selecting one of said divided display areas having a largest dimension among all of said divided display areas;

a second dividing section for further dividing the selected divided display area into two divided display areas, the area selection by said area selecting section and the division by said second dividing section being repeated until a predetermined completion condition is satisfied; and a layout section for laying out said multiple pieces of content information to display the corresponding content information in each said divided display area, wherein said first dividing section and said second dividing section respectively including: a direction determining section for calculating aspect ratio of an area and determining direction to divide said area based on the calculated value; an aspect ratio estimating section for tentatively determining position to divide within said area and estimating aspect ratio of each area when said area is divided into two at said tentative position; a judgment section for judging whether said aspect ratio of each area estimated in said aspect ratio estimating step is in a predetermined range; a position determining section for determining to divide said area at said tentative position when said aspect ratio of each area is in said predetermined range; and a dividing section for dividing said area into two in the direction determined by said direction determining section at the position determined by said position determining section, wherein the aspect ratio estimation by said aspect ratio estimating section and the judgment by said judgment section are repeated to determine a position to divide until said aspect ratio of every area is judged to be in said predetermined range.

13. The content display device of claim 12 further comprising:

a value assigning section for calculating aspect ratio of each said content information and assigning the calculated value to each said content information;

an area ranking section for ranking said divided display areas according to a predetermined standard; and an allocating section for calculating aspect ratio of each said display area in the ranked order and sequentially allocating one of said content information having closest aspect ratio to said divided display area.

14. The content display device of claim 13, wherein said area ranking section ranks said divided display areas according to their dimensions.

15. The content display device of claim 12 further comprising:

a content ranking section for ranking said multiple pieces of content information according to a predetermined standard;

an area ranking section for ranking said divided display areas according to a predetermined standard; and an allocating section for allocating said multiple pieces of content information to said divided display areas in the ranked order.

16. The content display device of claim 15 further comprising:

a value assigning section for assigning a predetermined value to each said content information, wherein said multiple pieces of content information are ranked according to the assigned predetermined values.

* * * * *